United States Patent Office 3,255,260
Patented June 7, 1966

3,255,260
PRODUCT PEAKING BY USE OF AQUEOUS ALCOHOL IN TELOMERIZATION
Donald J. Anderson, San Anselmo, Calif., assignor to Chevron Research Company, a corporation of Delaware
No Drawing. Filed Jan. 4, 1962, Ser. No. 164,377
10 Claims. (Cl. 260—642)

This invention relates to a novel method of producing long chain alcohols. More particularly, this invention affords an improved telomerization process whereby alcohols are obtained within a narrow range of chain lengths.

The telomerization reaction has found frequent application in obtaining higher molecular weight compounds from low molecular weight compounds. Numerous patents have issued using low molecular weight alcohols such as methanol, ethanol, isopropanol, etc. and ethylene to form high molecular weight alcohols, e.g., U.S. Patent Nos. 2,402,137, 2,668,181, 2,713,071, and 2,717,910. When a product having a relatively narrow range of molecular weight is desired, telomerization is usually unsatisfactory. Unless the relatively low molecular weight products are desired, i.e., addition of only 1 or 2 olefins, a broad range of products is obtained. In U.S. Patent No. 2,713,071, using isopropanol and ethylene, the product distribution was reported as follows: less than $C_{10}$—60%, $C_{11-21}$—29%, over $C_{21}$—11%. The large proportion of alcohols other than the desirable $C_{10}$–$C_{21}$ alcohols makes the product yield from the telomerization unattractive for the preparation of the fatty alcohols which are used in the production of detergents.

It has now been found that the amount of alcohol obtained in the desirable $C_{10}$–$C_{21}$ range may be greatly enhanced if aqueous alcohol is used, rather than the alcohol itself. Gross amounts of water result in a significant increase in the formation of alcohols in the $C_{10}$–$C_{21}$ range with a concomitant decrease in the yield of alcohols of lower and higher chain length.

As in the usual telomerizations, elevated temperatures and pressures are used, as well as free radical catalysts. While not very sensitive to minor changes, the product distribution will vary in relation to variations in the temperature and pressure as well as the choice and concentration of the catalyst and water/alcohol ratio.

Small concentrations of water do not afford the novel result obtained by using large concentrations of water with the alcohol. By using amounts of water in excess of 30%, the yield of the desirable $C_{10}$–$C_{21}$ range is greatly enhanced while the yield of higher and lower molecular weight alcohols is significantly decreased. A peaking of the product is obtained with alcohol-water mixtures in the range of about 3:7 to 7:3, with a preferred range being 4:6 to 3:7, and a particularly preferred ratio being about 1:1. Amounts of water significantly greater than 70% or less than 30%, either reduce the available alcohol to too great a degree or do not provide a peaking of the product in the $C_{10}$–$C_{21}$ range.

While any of the lower alkanols having an alpha hydrogen may be used in this invention, isopropanol is preferred. The primary alcohols of up to and including 3 carbons, i.e., methanol, ethanol, propanol, all have more than one alpha hydrogen. Since more than one chain may grow from the same alcohol, the probability is increased of a greater variety of alcohols in the product. With isopropanol there is only one alpha hydrogen, thus permitting a greater homogeneity in the product.

Temperature is partially determined by the choice of catalyst. While any free radical catalyst would be operative in this invention, the peroxidic catalysts are preferred. Particularly preferred as di-tertiary alkyl peroxides, such as di-tert.-amyl peroxide, di-tert.-butyl peroxide, etc. and hydrogen peroxide.

It is necessary in this invention that a major portion of the peroxide be predominantly decomposed in a relatively short period of time. The time for almost total decomposition should generally not exceed 30 minutes. The half-life for the decomposition should not exceed about twenty minutes, with a half-life of less than ten minutes preferred. Particularly preferred are half-lives less than five minutes.

The temperature while related to the choice of catalyst must also be high enough to afford a reasonable rate of reaction. While any of the lower alkenes such as ethylene, propylene, isobutylene, etc. should be operative in this invention, ethylene is preferred.

The pressure is related to the temperature. In order to obtain similar product distributions when varying temperature, other variables being maintained constant, the pressure should be increased with increasing temperature. Maintaining the pressure constant while increasing the temperature will generally result in a reduction of the average molecular weight of the product; maintaining the temperature while increasing the pressure will generally result in an increase in average molecular weight of the product. The pressure is not critical and pressures in the range of 250 p.s.i. to about 5000 p.s.i. have been found operative.

The product distribution will also depend on the ratio of alcohol to catalyst. Increasing the concentration of catalyst will generally result in lower molecular weight products. Higher molecular weight products may be obtained by decreasing the ratio of catalyst to alcohol. Weight percent of catalyst based on alcohol will usually vary from about 0.1 to 15% depending on the catalyst and other variables, with 0.5 to 10.0 weight percent being preferred, and particularly preferred is 0.5 to 5.0 weight percent.

While any of the lower alkenes should be operative in this invention, ethylene, propylene, isobutylene, etc., ethylene is preferred. The use of ethylene provides a linear chain bonded to the alpha carbon of the alcohol.

The reaction may be run batchwise or in a continuous manner. The reaction time is not critical, for the reaction is predominantly effected within a few minutes. Further heating is usually desirable to ensure the complete decomposition of the peroxidic catalyst. When a continuous process is used, residence times will vary in the range of about 5 seconds to 500 seconds, depending on temperature, pressure, catalyst, etc.

Without intent of placing any further limitations on the invention as hereinbefore described, the following examples are given to illustrate the invention in some detail. The following example illustrates a batch process:

*Example I*

A mixture of 150 g. of isopropanol, 150 g. of water and 7.5 g. of di-tert.-butyl peroxide was heated to 110° C. under 500–800 p.s.i.g. of ethylene. Heating was terminated and the temperature rose to 135°–145° C. in six minutes with rapid uptake of ethylene. The temperature continued to climb until after 12 minutes it had reached 180° C., while the pressure was maintained at approximately 1000 p.s.i.g. The temperature then fell to 150° C. in 24 minutes and was maintained for approximately 40–60 minutes to ensure complete decomposition of the catalyst. The reaction mixture weighed 350 g., an increase of 42.5 g.

Of the products obtained, 11.6 g. were alcohols of $C_5$–$C_9$, 39.8 g. were alcohols in the range $C_{11}$–$C_{21}$, and a small residue of alcohols above $C_{21}$.

The following table illustrates a number of runs using a batch method according to the previous procedure with a comparison of the effect of varying the alcohol-water ratio.

TABLE I

| Example | Isopropanol, gms. | Water, gms. | Di-tert.-butyl Peroxide, gms. | Pressure, p.s.i.g. | Max. Temp., °C. | Total Product | Product Distribution, g. | |
|---|---|---|---|---|---|---|---|---|
| | | | | | | | $C_5-C_9$ | $C_{11}-C_{21}$ |
| II | 300 | 0 | 15 | 600 | 210 | 77.3 | 64.4 | 12.9 |
| III | 300 | 60 | 15 | 400 | 200 | 42.6 | 36.7 | 5.9 |
| IV | 150 | 150 | 7.5 | 1,000 | 180 | 58.0 | 18.2 | 39.8 |
| V | 150 | 100 | 7.5 | 1,000 | 176 | 53.4 | 12.1 | 40.0 |
| VI | 150 | 185 | 7.5 | 1,000 | 178 | 54.4 | 11.8 | 42.6 |
| VII | 150 | 150 | 5.0 | 1,000 | 177 | 36.6 | 3.4 | 31.5 |
| VIII | 150 | 150 | 10.0 | 1,000 | 185 | 57.8 | 7.5 | 47.3 |
| IX | 150 | 150 | 15.0 | 1,000 | 196 | 65.5 | [1] 18.5 | 47.0 |

[1] Contains 8.5 g. of $C_9$.

The following example illustrates the use of a continuous process.

*Example X*

The reactor was a 40 ft. long stainless steel coil of 3/32" internal diameter immersed in a constant temperature bath. Fifty percent aqueous isopropanol containing 1.43 percent hydrogen peroxide was pumped into the reactor at a rate of 1030 ml. (934 g.) per hour. Simultaneously ethylene was fed in at 4.0 cu. ft. per hour at a pressure of 4000–4200 p.s.i. The temperature was maintained at 290±3° C.

After one hour the liquid product was distilled to remove the water and isopropanol. Gas chromatography of the 51 g. residue showed that the mixture was 85% $C_{11}$ to $C_{19}$ tertiary alcohols. No wax was obtained.

The following table is a comparison of runs carried out according to the previous procedure with and without the presence of gross amounts of water.

TABLE II

| Example | Weight Percent | | | Feed Rate, cc./hr. | Period of Run, hrs. | Total Tertiary Alcohol, g. | Initiator Consumed, g. | Pressure, p.s.i.g. | Temp., °C. | Product Distribution, g. | | |
|---|---|---|---|---|---|---|---|---|---|---|---|---|
| | Isopropanol | Water | $H_2O_2$ | | | | | | | $C_5-C_9$ | $C_{11}-C_{21}$ | Wax (>$C_{21}$) |
| XI | 97.5 | 1.75 | 0.75 | 412 | 1.66 | 50.0 | 4.12 | 4,000 | 288 | 24.8 | 51.1 | 36 |
| XII | 49.3 | 49.3 | 1.43 | 1,155 | 1.00 | 44.0 | 15.0 | 4,100 | 285 | 21.4 | 78.0 | 0 |

As will be evident to those skilled in the art, various modifications on this process can be made or followed, in the light of the foregoing disclosure and discussion, without departing from the spirit or scope of the disclosure or from the scope of the following claims.

I claim:
1. In a process for the telomerization of lower alkanols having at least one alpha hydrogen and ethylene with a peroxide catalyst in an amount from about 0.1 to 15% by weight of said alkanol at a temperature in the range of about 100 to 400° C. and a pressure in the range of about 250 to 5,000 p.s.i., the improvement which comprises using aqueous alkanol and having a weight ratio of alkanol to water in the range of about 3:7 to 7:3 and a temperature wherein the half-life of said catalyst is less than about twenty minutes.

2. A process according to claim 1 wherein said lower alkanol is isopropanol.

3. A process according to claim 2 wherein the aqueous isopropanol has a ratio of isopropanol to water in the range of about 4:6 to 3:7.

4. A process according to claim 2 wherein said peroxidic catalyst is hydrogen peroxide and in amount of 0.5 to 5 weight percent of the weight of alkanol.

5. A process according to claim 2 wherein said peroxidic catalyst is di-tertiary butyl peroxide and in amount of 0.5 to 5 weight percent of the weight of isopropanol.

6. In a process for the telomerization of lower alkanols having at least one α-hydrogen and ethylene with a peroxidic catalyst in an amount of about 0.5 to 5 weight percent of said alkanol at a temperature in the range of about 150° to 400° C. and a pressure in the range of about 250 p.s.i. to 5,000 p.s.i., the improvement which comprises using aqueous alkanol and having a weight ratio of alkanol to water in the range of about 4:6 to 3:7 and a temperature wherein the half-life of said catalyst is less than about 20 minutes.

7. A process according to claim 6 wherein the weight ratio of alkanol to water is about 1:1.

8. A process according to claim 6 wherein said lower alkanol is isopropanol.

9. A process according to claim 6 wherein said peroxidic catalyst is di-tertiary-butyl peroxide.

10. A process according to claim 6 wherein said peroxidic catalyst is hydrogen peroxide.

References Cited by the Examiner
UNITED STATES PATENTS

| 2,402,137 | 6/1946 | Hanford et al. | 260—642 |
| 2,668,181 | 2/1954 | Banes et al. | 260—642 |
| 2,713,071 | 7/1955 | Erchak | 260—642 |

LEON ZITVER, *Primary Examiner.*

BRUCE M. EISEN, M. B. ROBERTO, *Examiners.*